United States Patent [19]

Tomita et al.

[11] Patent Number: 4,532,807

[45] Date of Patent: Aug. 6, 1985

[54] METHOD AND APPARATUS FOR DETECTING SOUND SOURCE

[75] Inventors: Naotaka Tomita, Sayama; Toshiyuki Watanabe, Tokorozawa, both of Japan

[73] Assignee: Bridgestone Tire Company Limited, Tokyo, Japan

[21] Appl. No.: 537,609

[22] Filed: Sep. 30, 1983

[30] Foreign Application Priority Data

Oct. 1, 1982 [JP]  Japan ................................ 57-172694

[51] Int. Cl.³ ............................................ G01N 29/04
[52] U.S. Cl. ........................................ 73/602; 73/641; 73/146
[58] Field of Search ................. 73/602, 641, 634, 587, 73/146

[56] References Cited

U.S. PATENT DOCUMENTS

| | | | |
|---|---|---|---|
| 3,534,591 | 10/1970 | Phelan ................................... | 73/641 |
| 3,996,791 | 12/1976 | Niklas et al. .......................... | 73/602 |
| 4,063,549 | 12/1977 | Beretsky et al. ...................... | 73/602 |
| 4,170,142 | 10/1979 | Posakony et al. ..................... | 73/641 |
| 4,301,684 | 11/1981 | Thompson et al. ................... | 73/602 |

*Primary Examiner*—Anthony V. Ciarlante
*Attorney, Agent, or Firm*—Sughrue, Mion, Zinn, Macpeak, and Seas

[57] ABSTRACT

In a method and an apparatus for detecting a sound source, a measurement plane to be observed is automatically scanned in two-dimensional manner by means of two microphones which are spaced apart from each other by a given distance and are moved by a traversing device. Outputs of these microphones are sampled for successive measurement regions and then are processed by processing circuit including a fast Fourier transform to derive acoustic intensities with respect to various frequencies in a given frequency range. Then, a distribution of the acoustic intensities is indicated on a display device by using various indication techniques. Therefore, since the measurement is effected by using the acoustic intensity representing both a sound power and a propagating direction, the analysis of the sound source can be performed in an easy and accurate manner, and an entier apparatus can be small in size and inexpensive in cost.

11 Claims, 8 Drawing Figures

FIG.3B
FIG.3C
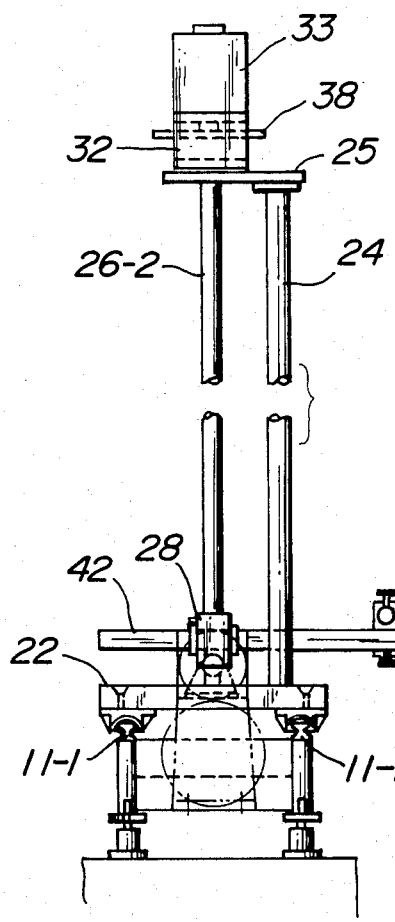
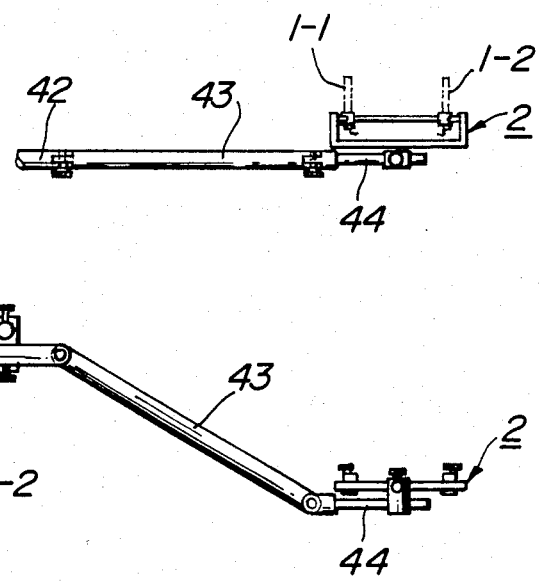

FIG_4
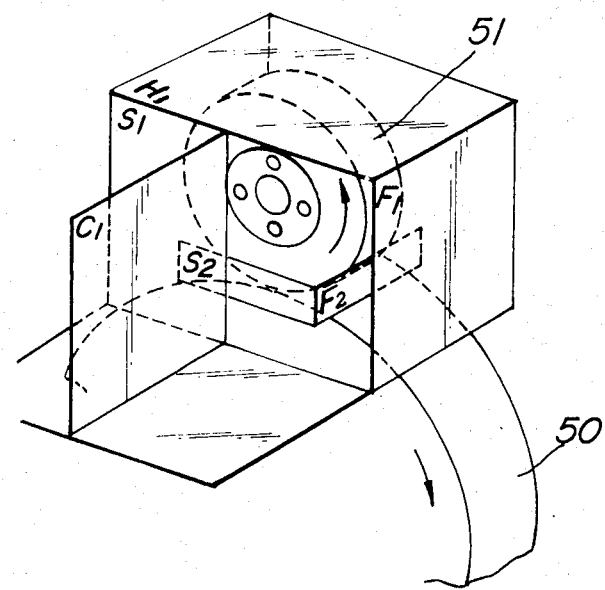

FIG._5A
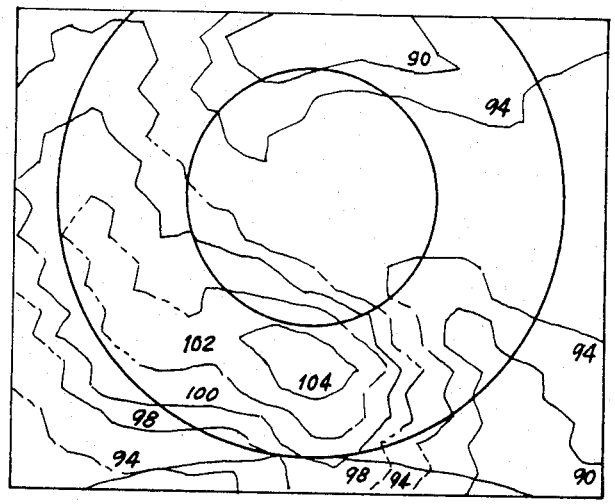
FIG._5B
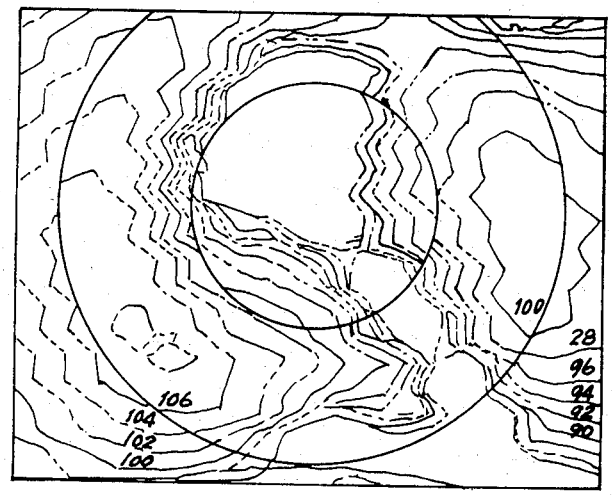

METHOD AND APPARATUS FOR DETECTING SOUND SOURCE

BACKGROUND OF THE INVENTION

The present invention relates to a method and an apparatus for detecting a sound source.

Recently, requirements for reducing noise from a vehicle have become severe in view of environment concerns, and thus various studies for reducing noise have been performed for a tire as well as a vehicle body itself.

In a conventional method for measuring tire noise, a sound pressure level of the noise is measured by means of one microphone arranged apart by a constant distance from the tire rotating on a test table. However, in this known method, it is impossible to specify that portion of the tire which produces noise and provide useful data for reducing the noise level.

In this connection, in order to obtain the sound pressure of the noise together with its direction, a study about acoustic intensity has been developed. Hereinafter, acoustic intensity will be explained.

In an acoustic field, a sound emitted, from the sound source can be described in the term of a total power and an emitting direction thereof, and thus an arbitrary point in the acoustic field to be investigated can be expressed only by these two information. The power of the sound source can be expressed by a sum of energy fluxes passing through a closed-surface surrounding it. The acoustic intensity is described by the energy fluxes passing through a unit surface perpendicular to a sound propagating direction within a unit time and the unit thereof is expressed by [Watt/m$^2$]. Therefore, if it is assumed that the total power of the sound source is W and acoustic intensity on the closed-surface A is I, the following equation is derived.

$$W = \int\int_A I \cdot dA \tag{1}$$

An instantaneous value I(r) of the acoustic intensity I at a point r is described by a product between the sound pressure (scalar amount) and an acoustic velocity (vector amount), and normally expressed by the folowing equation with taking an average time into account, $$I(r) = E\left[\int_{-\infty}^{\infty} P(r, t) V(r, t) dt\right] \tag{2}$$

where E is an expected value, P(r, t) is the sound pressure at the point r and V(r, t) is the acoustic velocity at the point r.

In case of measuring only the sound pressure representing the scalar amount, since the sound pressure does not include the component of the sound propagating direction, it is very difficult to accurately grasp an acoustic output of the sound generated from the sound source to be observed due to the influence of noise reflected by the surrounding portions and generated from other portions, and also difficult to detect accurately the position of the sound source.

Contrary to this, in case of measuring the noise by the acoustic intensity representing the vector, since the strength and the direction of the transmitting sound can be detected, it is possible to measure accurately the acoustic output of the sound source to be observed without being affected by the sound generated from the other portions. Moreover, it is possible to derive accurately the position of the sound source by measuring a distribution of the sound strength.

As mentioned above, the acoustic intensity is characterized in that it is expressed by the product between the sound pressure (scalar amount) and the acoustic velocity (vector amount). Here, the sound pressure can be measured directly by a microphone, but it is very difficult to measure the acoustic velocity. Therefore, as shown in FIG. 1, two microphones 1-1 and 1-2 are arranged apart by a constant distance $\Delta r$, and the acoustic intensity is derived by calculating respective outputs of these microphones 1-1 and 1-2. That is to say, in FIG. 1, if it is assumed that the outputs representing the sound pressure of the microphones 1-1 and 1-2 are $P_1(t)$ and $P_2(t)$, respectively, the sound pressure P(t) at the middle point between two microphones is approximated by the following equation.

$$P(t) = \tfrac{1}{2}[P_2(t) + P_1(t)] \tag{3}$$

Moreover, an inclination of the sound pressure in an arrow direction in FIG. 1 is also approximated as follows;

$$\frac{\delta P(t)}{\delta r} = \frac{1}{\Delta r}[P_2(t) - P_1(t)] \tag{4}$$

Therefore, the acoustic velocity can be approximated in the following manner;

$$V(t) = \frac{-1}{\rho \Delta r} \int [P_2(t) - P_1(t)] dt, \tag{5}$$

where $\rho$ is the density of air.

In this manner, the acoustic intensity is obtained by calculating the sound pressure and the acoustic velocity derived from the equations (3) and (5), respectively. This calculation method is a so-called acoustic wattmeter and has been studied for a long time. Further, since recently it becomes easy to effect an examination in a frequency field by using a fast Fourier transform (FFT), a method for deriving the acoustic intensity by using a cross spectrum has been developed.

Hereinafter, the method for deriving the acoustic intensity by using the cross spectrum will be explained.

At first, the Fourier transforms of the sound pressure P(r) and the acoustic velocity V(r) at the point r are described respectively as follows;

$$P(r, f) = \int_{-\infty}^{\infty} P(r, t) e^{-j2\pi ft} dt \tag{6}$$

$$V(r, f) = \int_{-\infty}^{\infty} V(r, t) e^{-j2\pi ft} dt, \tag{7}$$

where $j = \sqrt{-1}$. Since the sum of the acoustic intensity in the time field is equal to that in the frequency field, the following relation must be satisfied;

$$\int_{-\infty}^{\infty} P(r, t) V(r, t) dt = \int_{-\infty}^{\infty} P(r, f) V^*(r, f) df, \tag{8}$$

where $V^*(r, f)$ denotes the complex conjugate of V(r, f).

Here, a density function J of the acoustic intensity is described as follows.

$$J(r, f) = E[P(r, f)V^*(r, f)] \quad (9)$$

Since the integration of the density function J in the frequency field is equal to the acoustic intensity I, the following equation is derived.

$$I(r) = \int_{-\infty}^{\infty} J(r, f) \, df \quad (10)$$

If the abovementioned method for deriving the acoustic intensity by using the cross spectrum is applied to that by using two microphones 1-1 and 1-2, the Fourier transforms of the sound pressure and the acoustic velocity respectively shown in equations (3) and (5) can be expressed by the following equations, respectively.

$$P(f) = \tfrac{1}{2}[P_2(f) + P_1(f)] \quad (11)$$

$$V(f) = \frac{-1}{j2\pi f \rho \Delta r}[P_2(f) - P_1(f)] \quad (12)$$

Therefore, the density function J of the acoustic intensity can be rewritten in the following manner.

$$j(f) = E[P(f) V^*(f)] \quad (13)$$

$$= \frac{1}{j4\pi f \rho \Delta r} E[(P_2(f) + P_1(f))(P_2^*(f) - P_1^*(f))]$$

$$= \frac{1}{j4\pi f \rho \Delta r} E[|P_2|^2 - |P_1|^2 + P_2^*P_1 - P_1^*P_2].$$

In the equation (12), a term $j2\pi f$ in a denominator appears as a result of the integration in the frequency field.

In equation (13), since the following equation is satisfied;

$$P_2^*P_1 - P_1^*P_2 = 2jIm(P_1P_2^*), \quad (14)$$

the density function J can be rewritten into the following equation.

$$J(f) = \frac{1}{2\pi f \rho \Delta r} E[Im(P_1P_2^*)] + \frac{1}{j4\pi f \rho \Delta r} E\,|P_2|^2 - |P_1|^2 \quad (15)$$

In this case, since a term $E[|P_2|^2 - |P_1|^2]$ denotes a real even function with respect to the frequency and a term $$\frac{1}{4\pi f \rho \Delta r}$$

is an odd function, an imaginary part of the density function J becomes the odd function and thus becomes zero after effecting the integration shown in the equation (10).

Therefore, the acoustic intensity I is described as follows;

$$I = \int_{-\infty}^{\infty} Re(J(f)) \, df, \quad (16)$$

where $$Re(J(f)) = \frac{1}{2\pi f \rho \Delta r} E[(Im(P_1P_2^*)].$$

In this equation, a term $P_1P_2^*$ denotes a density of cross spectrum and a term $E[Im(P_1P_2^*)]$ is an imaginary part of the cross spectrum. Therefore, the acoustic intensity I can be derived easily by a two-channel FFT. The distance $\Delta r$ between two microphones 1-1 and 1-2 is a set a value corresponding to a sound frequency range to be measured, i.e. a smaller value in the high frequency range and a larger value in the low frequency range.

Hereinbefore, the explanation was made to the acoustic intensity and the method for calculating the acoustic intensity by using the cross spectrums detected by the two microphones. As to an apparatus for detecting the sound source by using the acoustic intensity derived from the cross spectrum, for example, an apparatus for detecting the sound source of a car engine has been well known. In this apparatus, a number of probes each having three microphones spaced apart from each other are secured to a frame surrounding the engine to be observed, and in each probe outputs of two microphones are selected among them corresponding to the frequency range of the sound to be measured. Then, these probes are electrically scanned and the acoustic intensities with respect to various frequencies are calculated at each of the probe arranging positions.

In the abovementioned apparatus for detecting the sound source, since it is necessary to arrange many probes for measuring the acoustic intensities with respect to various frequencies at many points, the apparatus is made large in size and expensive in cost. Moreover, since the measuring point i.e. the probe arranging position is limited so much, it is not possible to set a measuring interval etc. at will. Further, it becomes very troublesome work to adjust many microphones to have identical characteristics.

SUMMARY OF THE INVENTION

The present invention has for an object the elimination of drawbacks mentioned above and to provide a method and an apparatus for detecting a sound source wherein the apparatus can be made small in size and inexpensive in cost and also many measuring points can be set arbitrarily in an easy and accurate manner.

According to the invention, a method for detecting a sound source comprises the steps of scanning measurement regions in a measurement plane in an acoustic field to be observed automatically in a two-dimensional manner by at least two microphones which are spaced apart from each other by a given distance;

deriving acoustic intensities with respect to various frequencies in a given frequency range from outputs of said microphones in respective measurement regions by effecting calculations including a fast Fourier transform;

storing said acoustic intensities together with positional information of said microphones in said measurement plane; and indicating a distribution of said acoustic intensities in the measurement plane.

Further, according to the invention, an apparatus for detecting a sound source comprises at least two microphones;

a traversing device for supporting said microphones being spaced apart from each other by a given distance and for moving said microphones in a two-dimensional manner to scan successive measurement regions in a measurement plane;

a fast Fourier transform circuit for calculating a cross power spectrum with respect to various frequencies in a given frequency range on the basis of outputs of said two microphones in respective measurement regions;

a computer for calculating acoustic intensities with respect to various frequencies in said respective measurement regions on the basis of said cross power spectrum derived from said fast Fourier transform circuit;

a storing means for storing said acoustic intensities with respect to various frequencies together with positional information of said two microphones arranged on said traversing device; and a display device for indicating selectively said acoustic intensities with respect to respective frequencies in all the measurement regions stored in said storing means.

BRIEF DESCRIPTION OF THE DRAWINGS

FIGS. 3A, 3B and 3C are front view, side view and partially plan view, respectively showing one embodiment of a scanning mechanism according to the invention;

FIG. 4 is a schematic view illustrating a manner of measuring the sound source of a tire by means of the apparatus according to the invention; and FIGS. 5A and 5B are schematic views showing a distribution of sound pressure and that of acoustic intensities by a decibel, respectively, measured by the apparatus according to the invention.

DESCRIPTION OF THE PREFERRED EMBODIMENTS

Figure 1:
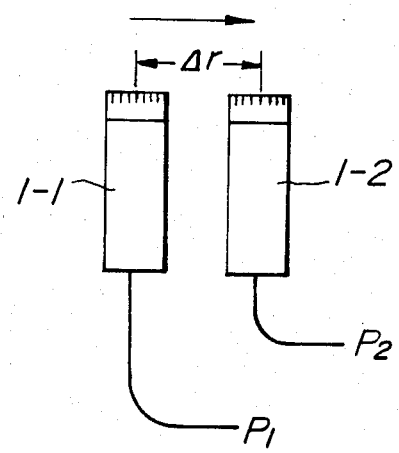
FIG. 1 is a schematic view for explaining a measuring theory of an acoustic intensity.
Figure 2:
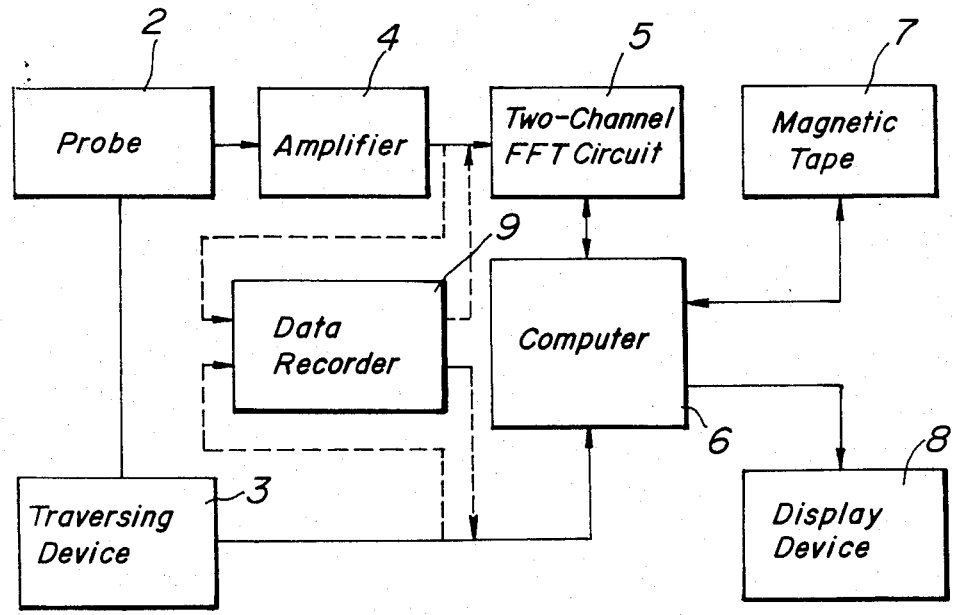
FIG. 2 is a block diagram showing one embodiment of the apparatus for detecting a sound source according to the invention.

FIG. 2 is a block diagram showing one embodiment of the apparatus for detecting a sound source according to the invention. In this embodiment, a probe 2 having two microphones spaced apart from each other by a predetermined distance as shown in FIG. 1 is moved to scan a measurement plane in a two-dimensional manner by a traversing device 3, and respective outputs of these two microphones are supplied to a two-channel FFT circuit 5 through an amplifier 4. The traversing device 3 for driving the probe 2 is of a self scanning type one and supplies scanning signals (positional information) to a computer 6 each time the probe 2 has moved over a predetermined measurement region. The measurement region can be initially determined by dividing the measurement plane into meshes having a suitable dimension and by estimating each grid point as a measurement start point.

The computer 6 functions to control the FFT circuit 5 by the signal supplied from the traversing device 3 to start a data entry operation. An analog output signal of the amplifier 4 is converted into a digital signal in the FFT circuit 5 to calcualte a cross spectrum therein. Then, an acoustic intensity is derived on the basis of the thus calculated cross spectrum. In this embodiment, while the probe 2 is moved continously at a constant speed in a main scanning direction by means of a traversing device 3, a plurality of data entry is effected for each measurement region and then an average value of the acoustic intensities (this average value with respect to time as well as with respect to space) is derived. After the average values of the acoustic intensities for all the measurement regions in one scanning line have been derived, they are supplied to a storing device, for example, a magnetic tape 7 and are stored therein.

In this manner, after the averaged acoustic intensities of all the measurement regions in the measurement plane have been stored in the magnetic tape 7, a distribution of the acoustic intensities with respect to a desired frequency component is indicated on a display device 8 under the control of the computer 6 by various indication techniques such as a contour map, a color segmentation, a gray level indication and a three-dimensional graphic.

Moreover, in this embodiment, the traversing device 3 can be separated from the computer 6 by sharing a part of the controlling function of the computer therein and also the amplifier 4 can be separated from the FFT circuit 5. Then, the outputs of the traversing device 3 and the amplifier 4 can be stored in a data recorder 9. In this case, it is not necessary to carry all the apparatus in the measuring room, but only the traversing device 3, the amplifier 4 and the data recorder 9 may be transported in the actually measuring field. Then, after the required data have been sampled and stored in the data recorder 9, at last the data recorder 9 is brought into an analyzing room and the acoustic intensity can be calculated and restored on the basis of the data stored in the data recorder 9 by using the FFT circuit 5, the computer 6 and the magnetic tape 7. Therefore, it is possible to make the apparatus portable and to effect the measurement easily.

Next, a probe scanning mechanism provided in the traversing device 3 for moving two-dimensionally the probe 2 having two microphones will be explained.

Figure 3A:
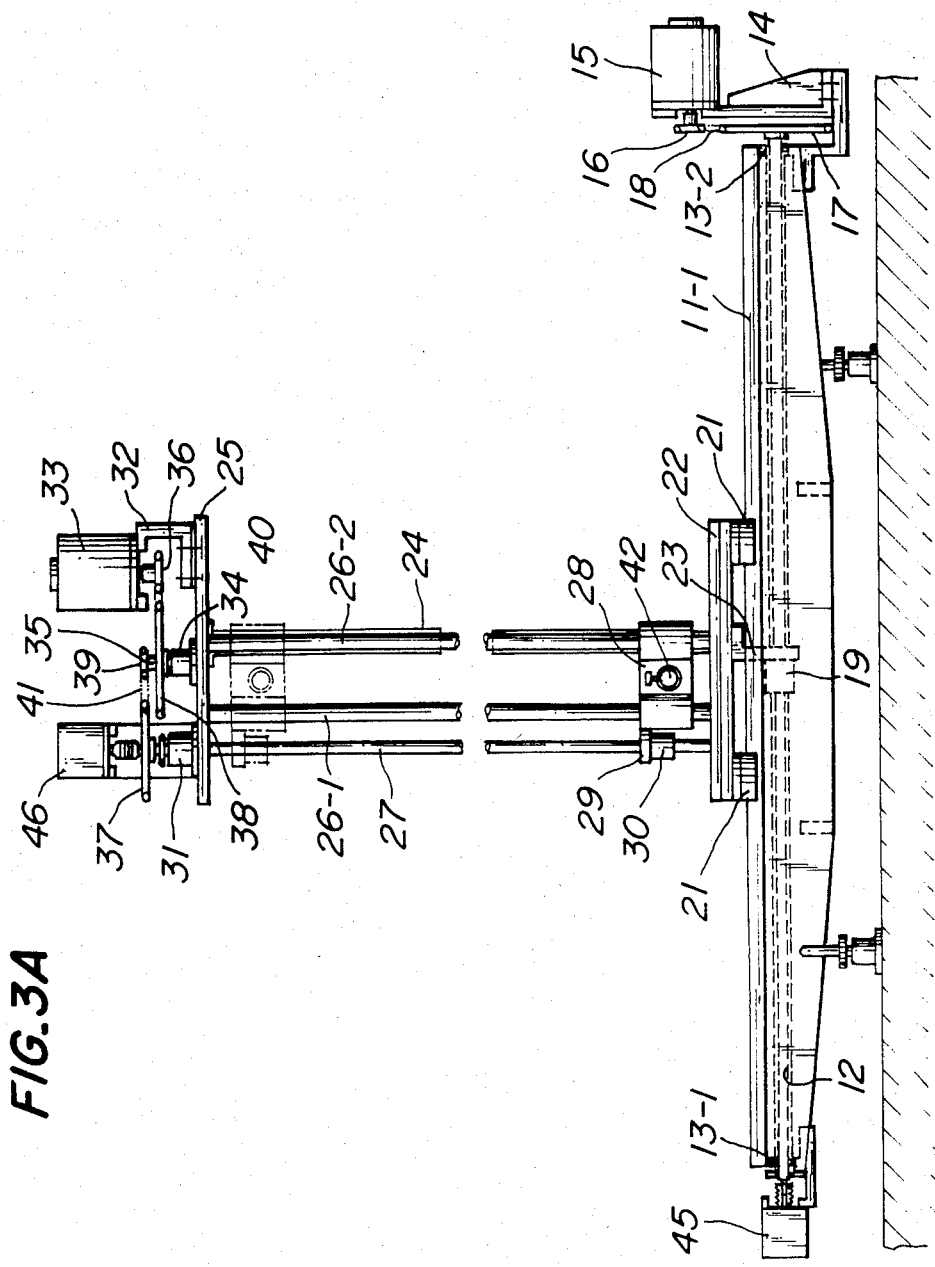

FIGS. 3A and 3B are a front view and a side view, respectively showing one embodiment of the probe scanning mechanism, and FIG. 3C is a plan view illustrating a part thereof. In this embodiment, two stationary rails 11-1 and 11-2 are arranged in parallel with each other in a horizontal direction, and a screw shaft 12 consisting of a ball screw is arranged between these rails in parallel therewith and is rotatably mounted by means of bearings 13-1 and 13-2. A motor 15 is secured to one end portions of the fixed rails 11-1 and 11-2 by means of a securing member 14 and also a pulley 16 is fixed to a drive shaft of the motor 15. Moreover, a pulley 17 is secured to one end portion of the screw shaft 12, and a belt 18 is wound between the pulley 17 and the pulley 16, and thus the screw shaft 2 is rotated by means of the motor 15 through the belt 18. In this manner, a nut 19 engaged with the screw shaft 12 can be moved along the rails 11-1 and 11-2 by rotating the motor 15.

A plate 22 is slidably mounted on the fixed rails 11-1 and 11-2 through bearings 21, and is connected to the nut 19 engaged with the screw shaft 12 by means of a metal fitting 23. Therefore, the slidable plate 22 can be moved along the rails 11-1 and 11-2 by the rotation of the screw shaft 12. Further, a vertical post 24 is secured to the slidable plate 22, and a horizontal plate 25 is secured to a top end of the post 24. Two guide rails 26-1, 26-2 and a screw shaft 27 consisting of the ball screw are arranged in parallel with each other between the plate 25 and the slidable plate 22 in the vertically extended manner. A holder 28 for securing the probe 2 is slidably arranged to the two guide rails 26-1 and 26-2 through a linear bearing not shown, and is connected to a nut 30 engaged with the screw shaft 27 by means of a metal fitting 29. A bottom end of the screw shaft 27 is rotatably secured to the slidable plate 22 and a top end thereof is also rotatably arranged by means of a bearing 31 arranged on the plate 25.

Further, a motor 33 is secured to the plate 25 by means of a plate 32, and a shaft 35 is rotatably provided in the plate 25 through a bearing 34. Moreover, pulleys 36 and 37 are arranged respectively to a drive shaft of the motor 33 and a top end of the screw shaft 27, and also two pulleys 38 and 39 are secured to the shaft 35. These pulleys have such diameters that a rotation angle between the pulleys 36 and 37 is equal to a predetermined ratio. Belts 40 and 41 are wound respectively between the pulleys 36, 38 and between the pulleys 39, 37, and thus the motor 33 drives the screw shaft 27. Therefore, the holder 28 can be slidably moved in a vertical direction along the guide rails 26-1 and 26-2.

Moreover, a rod 42 is arranged in the holder 28 slidably in the horizontal direction, and the probe 2 for holding the two microphones 1-1 and 1-2 is secured to the rod 42 through slidable joints 43 and 44. In this embodiment as illustrated in FIG. 3C, since at least one of two microphones 1-1 and 1-2 is slidably arranged in the probe 2, it is possible to adjust the distance therebetween by a given distance in a direction substantially perpendicular to the measurement plane.

Further, in this embodiment, in order to detect the position of the probe 2, a rotary encoder 45 is provided on one end of the screw shaft 12 remote the motor 15 which serves to move the slidable plate 22 along the fixed rails 11-1 and 11-2 in the horizontal direction. In addition, another rotary encoder 46 is secured to the top end of the screw shaft 27 which serves to move the holder 28 in the vertical direction.

In this embodiment, a moving range of the holder 28 i.e. a size of the measurement plane scanned by the probe 2 is max. 1,200 mm in the horizontal direction and max. 1,000 mm in the vertical direction and can be set at will within the range mentioned above. Moreover, the size of the maximum measurement plane can cover a side surface of tire of 10.00–20 size. Further, the dimension of the measurement region is a minimum 2 mm and can be set arbitrarily. In addition, a moving speed of the probe 2 in the main scanning direction (horizontal direction) can be set within a range of 0 to 25 mm/sec. by taking account of the size of the measurement region, the number of the samplings in respective measurement regions, etc. Moreover, the above mentioned various parameters are previously supplied to the computer 6.

In the aforementioned apparatus for detecting the sound source, since the two microphones 1-1 and 1-2 serve to scan the measurement plane automatically in the two-dimensional manner under the control of the traversing device 3 and the outputs of the two microphones 1-1 and 1-2 are calculated by the FFT circuit to obtain the distribution of the acoustic intensities. The entire apparatus can be made small in size and inexpensive in cost, and further it is possible to obtain high density data with respect to various frequencies by only one scanning operation for a short time period. Moreover, according to the invention, various conditions such as the size of the measurement plane, the size of the measurement region and the scanning density can be changed arbitrarily. Also the probe 2 can be secured to the traversing device 3 in the various ways. Therefore, in case of measuring a sound field of a tire 51 rotating on a rotatable drum 50 as shown in FIG. 4, the measurement plane can be easily set at not only a side surface $S_2$ of the tire 51 but also a front surface $F_1$, a rear surface, a surface $C_1$, including an axis of the tire 51 and arranged in parallel with the front surface $F_1$, and a top surface $H_1$ of the tire 51 measured by arranging a suitable adapter between the slidable plate 22 and the metal fitting 23, and thus it is possible to measure the whole sound field surrounding the tire 51 in an easy manner. In addition, a small measurement plane such as a front surface $F_2$, a side surface $S_2$ and a rear surface near a contact portion between the tire 51 and the drum 50 can be also set in an easy manner, and thus it is possible to analyze a noise pattern accurately. Further, since the outputs of the traversing device 3 and the amplifier 4 can be stored in the data recorder 9, it is possible to measure the sound source at an arbitrary place while the computer 6, the magnetic tape 7 and the display device 8 are kept always at another place. Furthermore, since at least one of two microphones 1-1 and 1-2 is slidably arranged to the probe 2 to adjust the distance therebetween, it is possible to perform an accurate measurement even if the frequency range of the sound to be measured is varied. Moreover, since the probe 2 is moved successively at a constant speed in the main scanning direction and the averaged acoustic intensity with respect to time and space can be obtained at the same time by effecting a plurality of sampling operations at respective measurement regions, it is possible to derive extremely reliable data and also the control of the traversing device 3 and the construction thereof can be made relatively simple.

The results of the measurements are shown in FIGS. 5A and 5B. In FIGS. 5A and 5B, the distribution of the sound pressure and that of the acoustic intensities are shown respectively. It should be noted that these characteristics were measured in the same condition. Circles in FIGS. 5A and 5B show a projection of the tire to be measured and the numerals illustrate the decibels by its contour. By means of these characteristics, the sound source can be specified very accurately and useful data about the noise produced by the rotating tire ca be obtained.

The present invention is not limited to the embodiments mentioned above, but various alterations and modifications are possible. For example, in the embodiment mentioned above, use is made of the distribution of the acoustic intensities, but it is possible to obtain also the distribution of the sound pressure levels with respect to various frequencies by calculating a sound decibel in the computer 6 from a power spectrum calculated from the Fourier transform in the FFT circuit 5. Moreover, according to the invention, the calculation of the cross spectrum or the power spectrum is performed in the FFT circuit 5, but use may be made of the computer 6 for this purpose. Further, the outputs of the rotary encoders 45 and 46 arranged in the traversing device 3 may be directly supplied to the computer 6. In this case the measurement region may be determined in the computer 6 and the data in the thus determined measurement region may be sampled on the basis of the outputs of the rotary encoders 45 and 46. Contrary to this, all the controls of the traversing device 3 may be performed by the computer 6. Furthermore, in the embodiment mentioned above, the probe 2 is moved successively at a constant speed in the main scanning direction and the averaged acoustic intensities with respect to time and space are obtained at the same time, but if the probe 2 may be moved intermittently to stop at successive measuring points, acoustic intensities actually averaged with respect to time may be obtained. Moreover the number of the microphones is not limited to two, but use may be made of three microphones arraned linearly with each other. In this case, it is possible to select two microphones among them in response to the frequency range of the sound to be measured. Further, more than three microphones may be arranged on three axes mutually perpendicular to each other, and then all the components of the cross spectrums in three directions may be obtained at the same time.

As mentioned above in detail, according to the invention, at least two microphones having a predetermined space therebetween are used to scan the measurement plane automatically in the two-dimensional manner, and then the acoustic intensities with respect to various frequencies are derived from the outputs of the two microphones in respective measurement regions by effecting the calculation including the fast Fourier transform. Therefore, it is possible to obtain the high density data with respect to various frequencies by only one scanning operation for the short time period, and also to make the apparatus small in size and inexpensive in cost. Moreover, since the number of the required microphones is small, the characteristics of these microphones can be easily made identical with each other and thus use may be made of the expensive and high performance microphone. Further, since the position and the space of the measuring points can be set arbitrarily, it is possible to detect the sound source more accurately.

What is claimed is:

1. A method for detecting a sound source comprising the steps of:
    scanning measurement regions in a measurement plane in an acoustic field to be observed automatically in a two-dimensional manner by at least two microphones which are spaced apart from each other by a given distance in a direction substantially perpendicular to said measurement plane;
    deriving acoustic intensities with respect to various frequencies in a given frequency range from outputs of said microphones in respective measurement regions by effecting calculations including a fast Fourier transform;
    storing said acoustic intensities together with positional information of said microphones in said measurement plane; and
    indicating a distribution of said acoustic intensities in the measurement plane.

2. A method according to claim 1, wherein an average time and an average space of said acoustic intensities is derived by effecting a plurality of measuring operations in respective measurement regions, said microphones are moved continuously at a constant speed in a main scanning direction and a plurality of measurements are effected to derive an averaged acoustic intensity with respect to time and space.

3. A method according to claim 1, wherein in respective measurement regions, said microphones are moved intermittently in a main scanning direction and a plurality of measurements are effected at measuring points to derive an averaged acoustic intensity with respect to time.

4. A method according to claim 1, wherein said indicating step is performed by an indication method selected from a group consisting of a contour map, a color segmentation, a gray level and a three-dimensional graphic.

5. A method according to claim 1, further comprising prior to the scanning, adjusting the distance between the two microphones in accordance with the frequencies range to be analized.

6. A method according to claim 1, wherein outputs from the microphones together with the positional information of the microphones are once stored in a data recorder, and the outputs and positional information read out of the data recorder are used to derive the acoustic intensites.

7. An apparatus for detecting a sound source comprising:
    at least two microphones;
    a traversing device for supporting said microphones and for moving said microphones in a two-dimensional manner to scan successive measurement regions in a measurement plane wherein said two microphones being spaced apart from each other in a direction substantially perpendicular to said measurement plane;
    a fast Fourier transform circuit for calculating a cross power spectrum with respect to various frequencies in a given frequency range on the basis of outputs of said two microphones in respective measurement regions;
    a computer for calculating acoustic intensities with respect to various frequencies in said respective measurement regions on the basis of said cross power spectrum derived from said fast Fourier transform circuit;
    a storing means for storing said acoustic intensities with respect to various frequencies together with positional information of said two microphones arrange on said traversing device; and
    a display device for indicating selectively said acoustic intensities with respect to respective frequencies in all the measurement regions stored in said storing means.

8. An apparatus according to claim 7, wherein said traversing device comprises a driving means for moving said microphones automatically in two-dimensional manner along a predetermined path, and a position detecting means for detecting positional information of said microphones.

9. An apparatus according to claim 8, further comprising a data recorder for storing outputs of said microphones together with said positional information thereof.

10. An apparatus according to claim 8, wherein said position detecting means comprises two rotary encoders for detecting horizontal and vertical positions of the microphones, respectively.

11. An apparatus according to claim 7, wherein said storing means comprises a magnetic tape.

* * * * *